(12) United States Patent (10) Patent No.: US 12,644,510 B2
Suwa (45) Date of Patent: Jun. 2, 2026

(54) HELICAL GEAR AND REDUCER

(71) Applicant: MABUCHI MOTOR CO., LTD., Chiba (JP)

(72) Inventor: Masakazu Suwa, Chiba (JP)

(73) Assignee: MABUCHI MOTOR CO., LTD., Chiba (JP)

( * ) Notice: Subject to any disclaimer, the term of this patent is extended or adjusted under 35 U.S.C. 154(b) by 0 days.

(21) Appl. No.: 18/704,927

(22) PCT Filed: Oct. 28, 2022

(86) PCT No.: PCT/JP2022/040326
§ 371 (c)(1),
(2) Date: Nov. 7, 2024

(87) PCT Pub. No.: WO2023/074839
PCT Pub. Date: May 4, 2023

(65) Prior Publication Data
US 2025/0067330 A1 Feb. 27, 2025

(30) Foreign Application Priority Data
Oct. 28, 2021 (JP) ................................. 2021-176169

(51) Int. Cl.
*F16H 55/17* (2006.01)
*F16H 1/32* (2006.01)

(52) U.S. Cl.
CPC .............. *F16H 55/17* (2013.01); *F16H 1/32* (2013.01)

(58) Field of Classification Search
CPC ... F16H 55/17; F16H 1/32; F16H 1/28; F16H 1/46; F16H 55/08
See application file for complete search history.

(56) References Cited

U.S. PATENT DOCUMENTS 5,188,576 A * 2/1993 Maguire ................. F16C 17/04
475/159
5,368,528 A 11/1994 Farrell
(Continued)

FOREIGN PATENT DOCUMENTS

JP 2007-537415 A 12/2007

OTHER PUBLICATIONS

International Search Report in PCT/JP2022/040326, mailed Jan. 17, 2023, 2pp.

(Continued)

*Primary Examiner* — Victor L MacArthur
(74) *Attorney, Agent, or Firm* — HAUPTMAN HAM, LLP

(57) ABSTRACT

A helical gear of the disclosure includes: a helical toothing portion of which helical tooth traces are formed on an outer tubular surface of a cylindrical rim; and a lightening portion formed in such a manner that an area of which distance to a shaft center on one end surface of the rim in an axial direction is equal to or less than a predetermined value is recessed toward the other end surface. Assuming that a ratio of a value obtained by subtracting a lightening thickness of the lightening portion from a thickness of the rim to a tooth thickness of the helical toothing portion is defined as a first ratio, and a ratio of a recess dimension to a total length dimension of the rim in the axial direction is defined as a second ratio, relationships between the first ratio and two ends of a range of the second ratio are P=12.628m−25.78 and P=9.8605n−88.24 where P: the first ratio [%], m: one end [%], and n: the other end [%].

7 Claims, 10 Drawing Sheets

(56)                References Cited

U.S. PATENT DOCUMENTS 10,077,832 B2 *    9/2018  Fugel .................... F16C 33/581
2005/0252328 A1    11/2005  Shattuck et al.

OTHER PUBLICATIONS

Written Opinion in PCT/JP2022/040326, mailed Jan. 17, 2023, 11pp.
Office Action in JP Application No. 2023-556662, mailed Jun. 3, 2025, 12pp.

\* cited by examiner

FIG. 9A          FIG. 9B
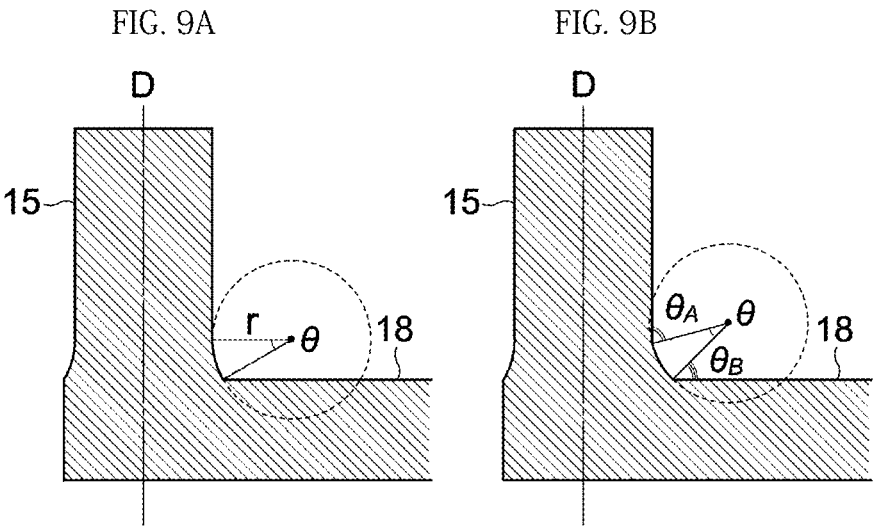
FIG. 10
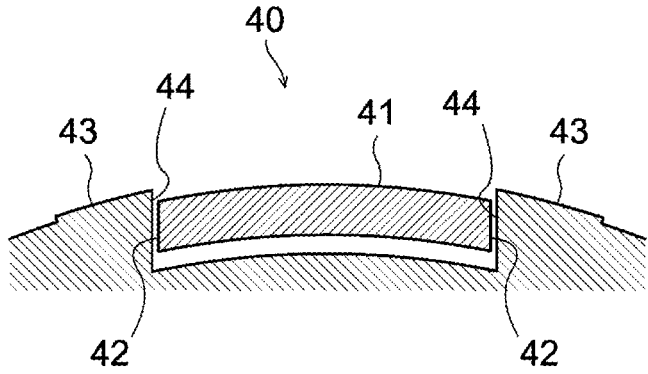
FIG. 11
| P FIRST RATIO [%] | Q SECOND RATIO [%] | FIRST TOOTH ROOT STRESS [MPa] | SECOND TOOTH ROOT STRESS [MPa] | THIRD TOOTH ROOT STRESS [MPa] |
|---|---|---|---|---|
| 19.0 | 3.6 | 14.4 | 13.0 | 12.7 |
| | 5.0 | 13.4 | 13.0 | 12.6 |
| | 6.4 | 13.0 | 13.0 | 13.0 |
| | 9.3 | 11.8 | 13.3 | 13.5 |
| | 10.7 | 11.6 | 13.5 | 14.2 |
| | 12.1 | 11.1 | 14.2 | 14.7 |

FIG. 14
| P FIRST RATIO [%] | Q SECOND RATIO [%] | FIRST TOOTH ROOT STRESS [MPa] | SECOND TOOTH ROOT STRESS [MPa] | THIRD TOOTH ROOT STRESS [MPa] |
|---|---|---|---|---|
| | 5.0 | 17.3 | 12.5 | 13.7 |
| | 6.4 | 16.9 | 12.5 | 13.9 |
| | 7.9 | 16.0 | 12.5 | 14.0 |
| 56.2 | 9.3 | 15.6 | 12.5 | 14.6 |
| | 10.7 | 15.2 | 12.7 | 15.1 |
| | 12.1 | 14.6 | 12.7 | 15.4 |
| | 15.0 | 12.3 | 13.3 | 16.7 |
FIG. 15
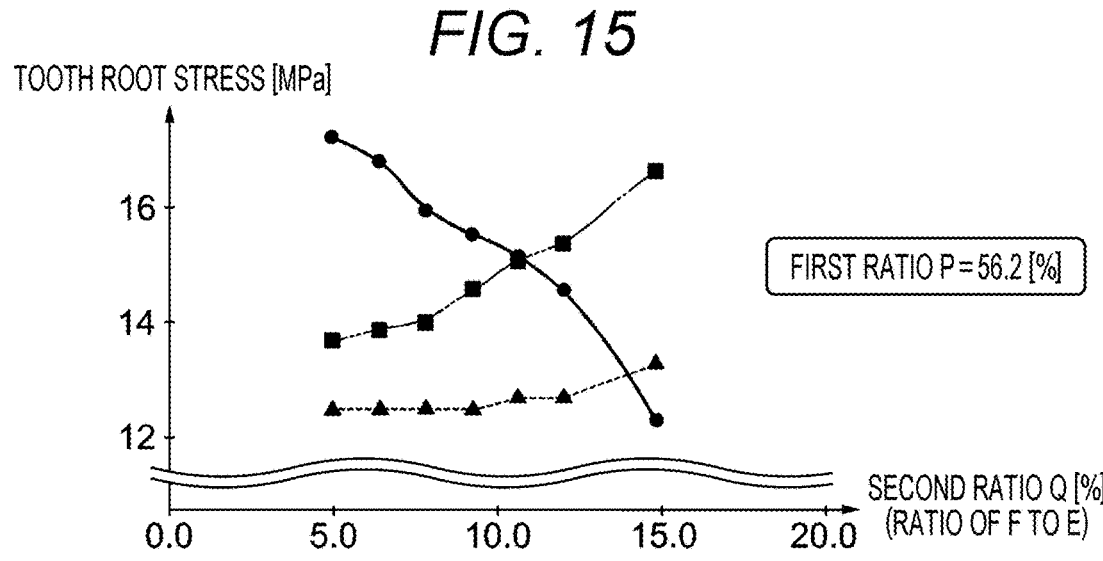
FIG. 16
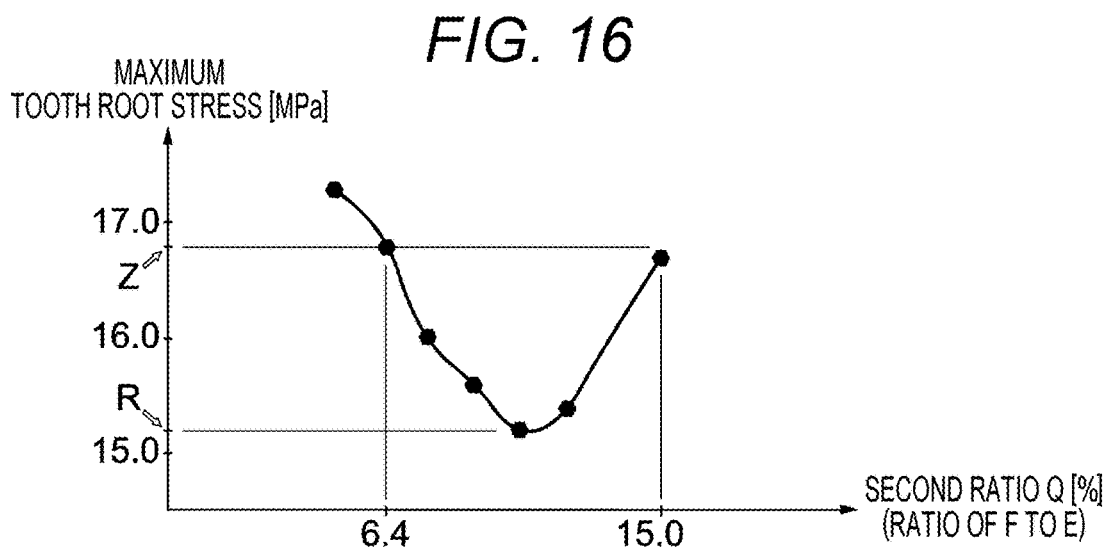

*FIG. 17*
| P<br>FIRST RATIO<br>[%] | Q<br>SECOND RATIO<br>[%] | FIRST<br>TOOTH ROOT<br>STRESS [MPa] | SECOND<br>TOOTH ROOT<br>STRESS [MPa] | THIRD<br>TOOTH ROOT<br>STRESS [MPa] |
|---|---|---|---|---|
| 103.8 | 6.4 | 16.5 | 12.9 | 12.8 |
| | 10.7 | 16.1 | 12.8 | 13.4 |
| | 15.0 | 14.6 | 12.8 | 14.5 |
| | 19.3 | 14.1 | 12.4 | 16.0 |
| | 23.6 | 13.5 | 12.4 | 17.3 |
*FIG. 18*
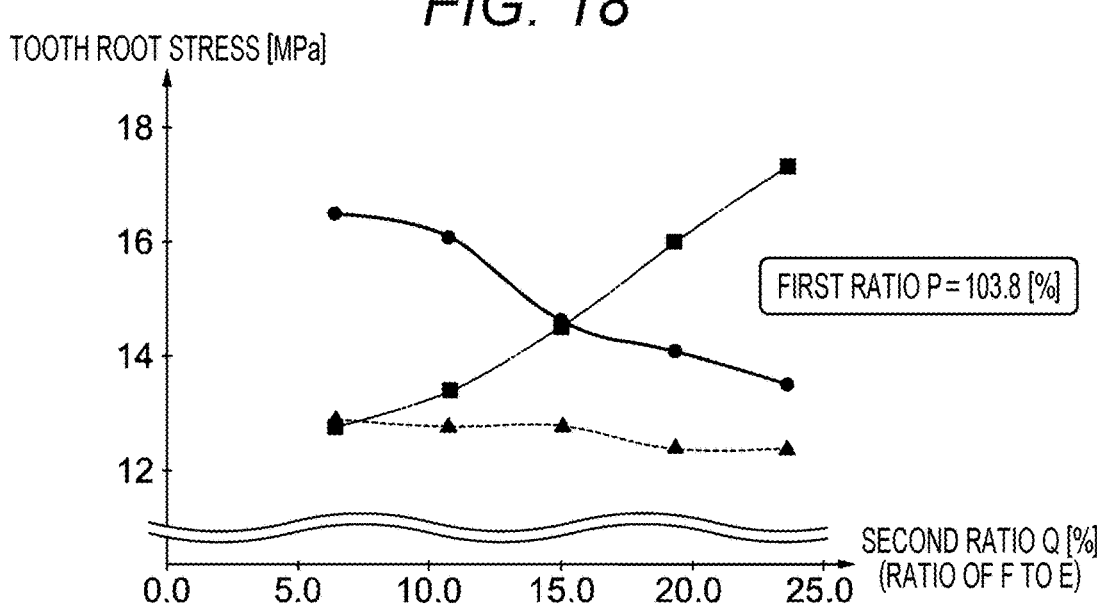
*FIG. 19*
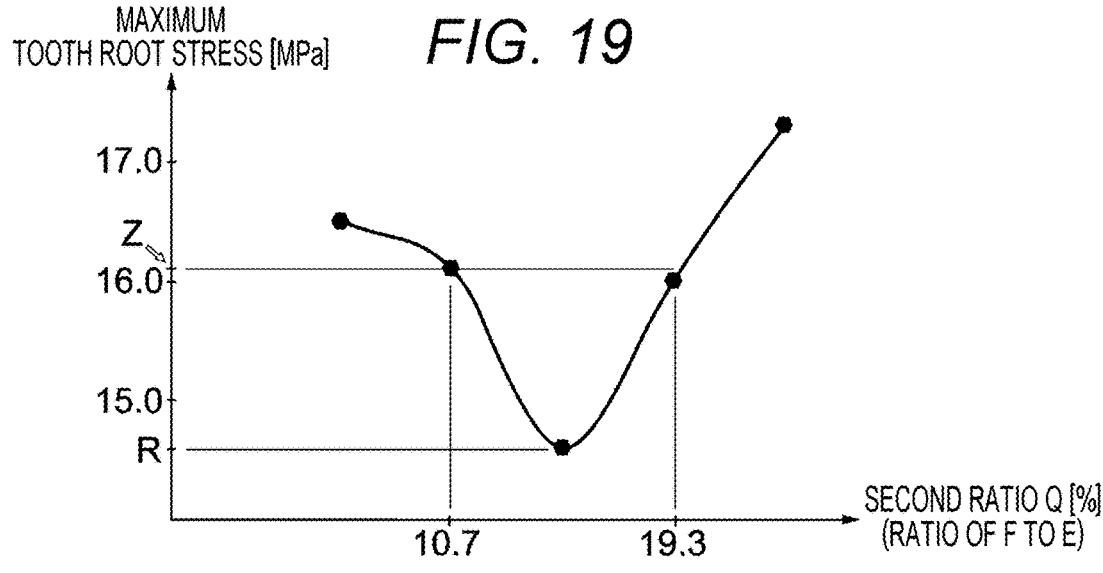

HELICAL GEAR AND REDUCER

RELATED APPLICATIONS

The present application is a National Phase of International Application No. PCT/JP2022/040326 filed Oct. 28, 2022, which claims priority to Japanese Application No. 2021-176169, filed Oct. 28, 2021.

TECHNICAL FIELD

The present invention relates to a helical gear and a reducer including the helical gear.

BACKGROUND ART

A helical gear (helical gear) is known which is a cylindrical gear formed in such a manner that tooth traces thereof are helices inclined relative to the axis of rotation (refer to Patent Literature 1). The anti-breakage performance of such a gear changes depending on the size of teeth and the rotation characteristics. For example, if the entire gear is increased in size, then the facewidth and the tooth thickness are increased, and the tooth root stress of the gear is reduced. Hence, it is possible to suppress the occurrence of damage and breakage. Moreover, the possibilities of damage and breakage can also be decreased by increasing the pressure angle of the gear and decreasing the rotational speed.

CITATION LIST

Patent Literature

Patent Literature 1: JP-T-2007-537415

DISCLOSURE OF THE INVENTION

Problems to be Solved by the Invention

On the other hand, an increase in the size of the gear leads to an increase in the size of an entire device targeted for application of the gear. Therefore, size reduction is difficult. Moreover, the rotation characteristics of the gear may not be able to be changed due to design constraints and requirements. For example, an increase in the pressure angle of the gear leads to a decrease in the contact ratio. In order to solve such problems, it is also considered that the gear is manufactured by use of a high-strength material to improve the anti-breakage performance without changing the shape. However, the high-strength material is expensive and drives up the cost.

One of objects of the present invention has been devised in light of problems such as described above, and is to provide a helical gear of which the anti-breakage performance can be improved while an increase in size and cost are suppressed, and a reducer including the helical gear. Note that the present invention is not limited to this object, and to exert operations and effects that are derived from configurations presented in "DESCRIPTION OF PREFERRED EMBODIMENTS" described below and cannot be obtained by a known technology can also be another object of the present invention.

Solutions to the Problems (1) A helical gear of the disclosure includes: a helical toothing portion of which helical tooth traces are formed on an outer tubular surface of a cylindrical rim; and a lightening portion formed in such a manner that an area of which a distance to a shaft center is equal to or less than a predetermined value on one end surface of the rim in an axial direction is recessed toward the other end surface. Assuming that a ratio of a value obtained by subtracting a lightening thickness of the lightening portion from a thickness of the rim to a tooth thickness of the helical toothing portion is defined as a first ratio, and a ratio of a recess dimension to a total length dimension of the rim in the axial direction is defined as a second ratio, relationships between the first ratio and two ends of a range of the second ratio are given by the following mathematical formulae:

$$P = 12.628m - 25.78$$

$$P = 9.8605n - 88.24$$

where P: the first ratio [%], m: one end [%], and n: the other end [%].

(2) In (1) described above, it is preferable that the first ratio be within a range from 19.0 to 103.8 [%]. In this case, it is preferable that the second ratio be within a range from 3.6 to 19.3 [%].

(3) In (1) or (2) described above, it is preferable that the second ratio be within a range from 6.4 to 15.0 [%].

Note that it is preferable that the second ratio be within a range from 3.6 to 10.7 [%] if the first ratio is 19.0 [%]. Moreover, it is preferable that the second ratio be within the range from 6.4 to 15.0 [%] if the first ratio is 56.2 [%]. Moreover, it is preferable that the second ratio be within a range from 10.7 to 19.3 [%] if the first ratio is 103.8 [%].

(4) In any of (1) to (3) described above, it is preferable that the lightening portion be provided in each of the one end surface and the other end surface of the rim in the axial direction, and that the recess dimension of the one end surface be equal to the recess dimension of the other end surface.

(5) In any of (1) to (4) described above, it is preferable that the helical gear be a planet gear of a planetary gear, and include a shaft hole that is bored in a hollow cylindrical shape that is coaxial with the shaft center and has a smaller radius than the predetermined value and into which a carrier pin of the planetary gear is rotatably inserted.

(6) In (5) described above, it is preferable that the helical gear include a sliding contact portion formed by causing an annular area of which a distance to the shaft center on the one end surface of the rim in the axial direction exceeds the predetermined value to protrude toward an opposite side to the other end surface side.

(7) A reducer of the disclosure includes: the helical gear according to (5) or (6) described above; an input shaft connected to a sun gear of the planetary gear; and an output shaft connected to a carrier including the carrier pin.

Effects of the Invention

According to a helical gear and a reducer of the disclosure, it is possible to improve anti-breakage performance while suppressing an increase in size and cost.

BRIEF DESCRIPTION OF THE DRAWINGS

FIGS. 9A and 9B are cross-sectional views of main elements of the first carrier of FIG. 1 (enlarged views of A of FIG. 1).

FIG. 10 is a cross-sectional view of a latch portion of FIG. 1 (a cross-sectional view of B of FIG. 1).

FIG. 11 is a table illustrating simulation results of CAE analysis on relationships between second ratios and tooth root stresses at a fixed first ratio of 19.0 [%].

FIG. 14 is a table illustrating simulation results of CAE analysis on relationships between the second ratios and the tooth root stresses at a fixed first ratio of 56.2 [%].

FIG. 15 is a graph illustrating the relationships between the second ratios and the tooth root stresses, which are illustrated in FIG. 14.

FIG. 16 is a graph illustrating relationships between the second ratios and maximum tooth root stresses, which are illustrated in FIG. 14.

FIG. 17 is a table illustrating simulation results of CAE analysis on relationships between the second ratios and the tooth root stresses at a fixed first ratio of 103.8 [%].

FIG. 18 is a graph illustrating the relationships between the second ratios and the tooth root stresses, which are illustrated in FIG. 17.

FIG. 19 is a graph illustrating relationships between the second ratios and maximum tooth root stresses, which are illustrated in FIG. 17.

DESCRIPTION OF PREFERRED EMBODIMENTS

1. Configuration

A helical gear and a reducer 7 including the helical gear as an example are described hereinafter.

Figure 1:
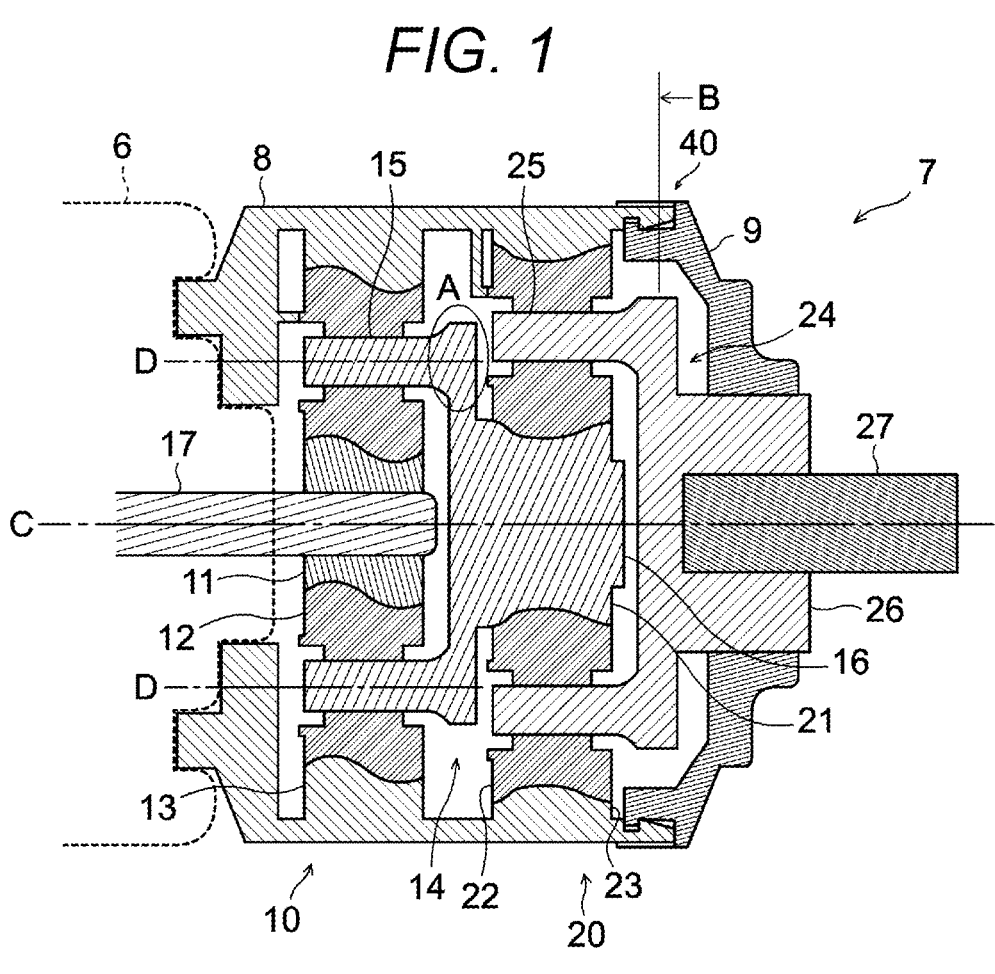
FIG. 1 is a cross-sectional view illustrating the configuration of a reducer as an example.

FIG. 1 is a cross-sectional view illustrating the configuration of the reducer 7 with the built-in helical gear. The reducer 7 is, for example, a gearbox that reduces the speed of a rotational driving force of a motor 6 and increases torque. The driving force generated by the motor 6 is inputted into the reducer 7 via an input shaft 17, shifted (reduced) in the reducer 7, and then outputted from an output shaft 27. A plurality of gears is interposed in a power transmission path from the input shaft 17 to the output shaft 27. The example illustrated in FIG. 1 is the reducer 7 with a built-in two-stage compound planetary gear that is a combination of a first planetary gear 10 and a second planetary gear 20.

The first planetary gear 10 and the second planetary gear 20 are housed in a gear housing 8 and a cover 9, which are formed in such a manner as to surround the reducer 7. The gear housing 8 has, for example, a hollow cylindrical shape of which the bottom surface side and top surface side are both open. The gear housing 8 illustrated in FIG. 1 has a shape of which the entire end surface on the right side relative to the paper surface of FIG. 1 is open. The truncated conical (tapered) cover 9 is mounted in the opening. The gear housing 8 and the cover 9 are locked together via a latch portion 40 provided in each of at least one or more places (in short, a plurality of places).

An end portion, which is on the left side relative to the paper surface, of the gear housing 8 illustrated in FIG. 1 is provided with an inclined portion having a truncated conical shape (taper shape). A hole through which the input shaft 17 being a rotary shaft of the motor 6 is inserted is formed in a central portion of the inclined portion (a top surface portion of the truncated cone). The motor 6 (of which the rough shape is indicated by a broken line) is mounted on the gear housing 8 in such a manner as to block the hole. Moreover, the cover 9 is mounted on an end portion, which is on the right side relative to the paper surface, of the gear housing 8 illustrated in FIG. 1. A hole through which the output shaft 27 is inserted is formed in a central portion of the cover 9 (the top surface portion of the truncated cone). The input shaft 17 and the output shaft 27 are placed coaxially with a central axis C of the gear housing 8.

Figure 2:
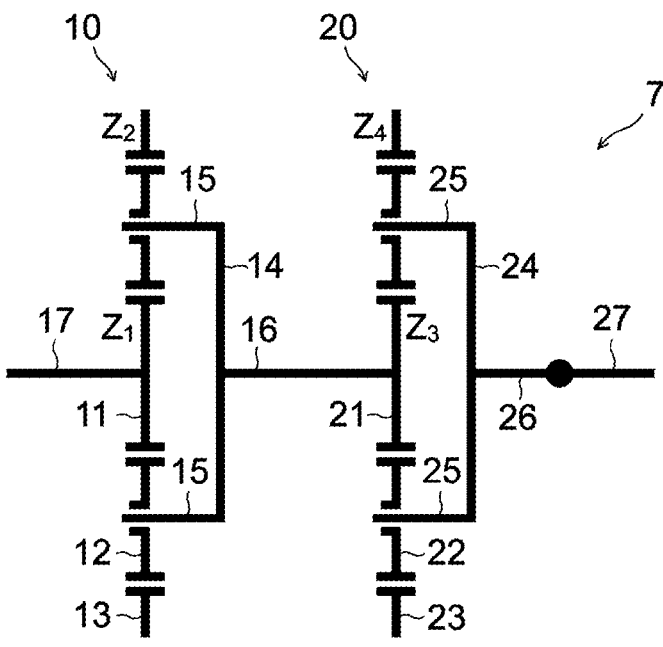
FIG. 2 is a skeleton diagram of a compound planetary gear built in the reducer of FIG. 1.

FIG. 2 is a skeleton diagram of the compound planetary gear built in the reducer 7. The first planetary gear 10 is provided with a first sun gear 11, a first planet gear 12, a first ring gear 13, and a first carrier 14. The first sun gear 11 is an external gear that is connected to (or formed integrally with) the input shaft 17. The first ring gear 13 is an internal gear formed on (or fixed to) an inner peripheral surface of the gear housing 8. The first planet gear 12 is an external gear interposed between the first sun gear 11 and the first ring gear 13, and meshes with both gears. Tooth traces formed on the gears 11 to 13 are helices. The first sun gear 11 and the first planet gear 12 are also called helical gears with external teeth. The first ring gear 13 is also called a helical gear with internal teeth.

Figure 3:
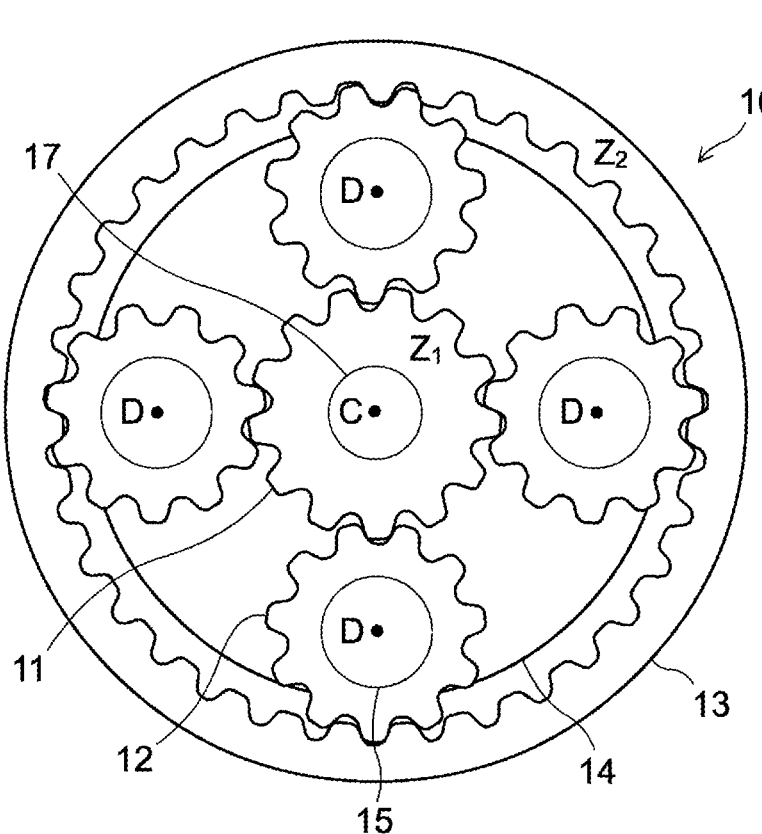
FIG. 3 is a front view of the planetary gear in FIG. 2.

FIG. 3 is a front view illustrating the first planetary gear 10 provided with four planet gears 12. The number of the first planet gears 12 can be freely set, and may be one, or two or more. The center of each of the first planet gears 12 is rotatably supported by a first carrier pin 15 fixed to the first carrier 14. The each of the first planet gears 12 is configured in such a manner as to be rotatable (rotatable) about a shaft center D of the respective first carrier pin 15.

As illustrated in FIGS. 1 to 3, a first carrier shaft 16 that is coaxial with the input shaft 17 is formed on (or fixed to) the first carrier 14. The first carrier 14 is configured in such a manner as to be rotatable about the first carrier shaft 16 (that is, about the central axis C). Consequently, the first planet gears 12 can orbit around the central axis C. Moreover, the first carrier shaft 16 has a function as an output shaft that outputs a rotational driving force of which the speed has been shifted by the first planetary gear 10. Let the number of teeth of the first sun gear 11 be $Z_1$, and let the number of teeth of the first ring gear 13 be $Z_2$. The speed reducing ratio of the rotational speed that is outputted from the first carrier shaft 16 (the ratio of the angular speed of the first carrier shaft 16 with respect to the input shaft 17) when the first ring gear 13 is fixed and the first sun gear 11 is rotationally driven is $Z_1/(Z_1+Z_2)$.

As illustrated in FIGS. 1 and 2, the second planetary gear 20 is provided with a second sun gear 21, a second planet gear 22, a second ring gear 23, and a second carrier 24. The second sun gear 21 is an external gear with a larger diameter than the first sun gear 11, and is connected to (or formed integrally with) the first carrier shaft 16. The first carrier shaft 16 of the example also has a function as an input shaft that inputs the rotational driving force into the second planetary gear 20. The second ring gear 23 is an internal gear with a larger diameter than the first ring gear 13, and is formed on (or fixed to) the inner peripheral surface of the gear housing 8. The second planet gear 22 is an external gear interposed between the second sun gear 21 and the second ring gear 23, and meshes with both gears. The gears 21 to 23 included in the second planetary gear 20 are also helical gears.

The center of the second planet gear 22 is rotatably supported by a second carrier pin 25 fixed to the second carrier 24. The second planet gear 22 is configured in such a manner as to be rotatable (rotatable) about the shaft center of the second carrier pin 25. Moreover, a second carrier shaft 26 that is coaxial with the input shaft 17 is formed on (or fixed to) the second carrier 24. The second carrier 24 is configured in such a manner as to be rotatable about the second carrier shaft 26 (that is, about the central axis C). Consequently, the second planet gear 22 can orbit around the central axis C. Moreover, the output shaft 27 that is coaxial with the input shaft 17 is connected to (or formed integrally with) the second carrier shaft 26.

The second carrier shaft 26 has a function as an output shaft that outputs a rotational driving force of which the speed has been shifted by the second planetary gear 20. Let the number of teeth of the second sun gear 21 be $Z_3$, and let the number of teeth of the second ring gear 23 be $Z_4$. The speed reducing ratio of the rotational speed that is outputted from the second carrier shaft 26 (the ratio of the angular speed of the second carrier shaft 26 with respect to the first carrier shaft 16) when the second ring gear 23 is fixed and the second sun gear 21 is rotationally driven is $Z_3/(Z_3+Z_4)$. Moreover, the speed reducing ratio of the output shaft 27 with respect to the input shaft 17 is $Z_1/\{Z_1+(Z_1+Z_2)Z_4\}$.

Figure 4:
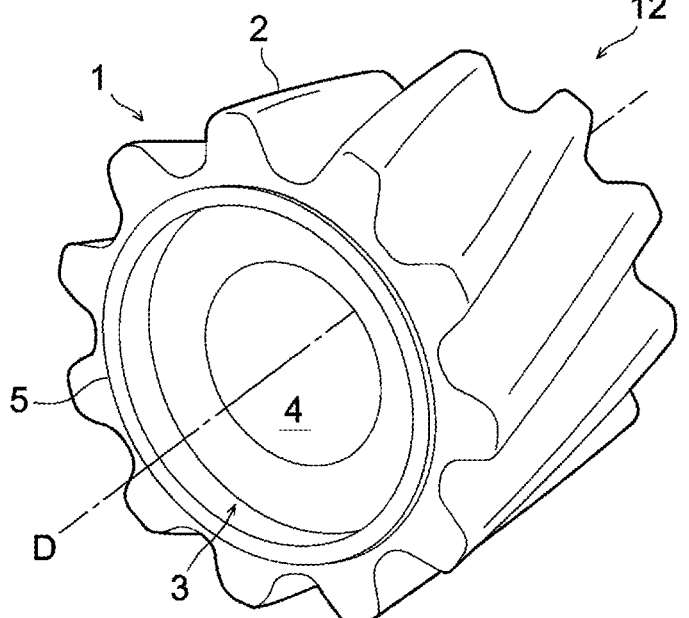
FIG. 4 is a perspective view of a helical gear applied to the planetary gear of FIG. 3.

FIG. 4 is a perspective view of the first planet gear 12 (helical gear). The first planet gear 12 is a helical gear of which helical tooth traces are formed on an outer tubular surface of a cylindrical rim 1, and includes a helical toothing portion 2. The helical toothing portion 2 is the outer tubular surface part of the rim 1, on which helical tooth traces thereof are formed. The tooth thickness of the helical toothing portion 2 (the thickness of a tooth part in the pitch diameter of the gear) is J. The first planet gear 12 is bored to have a shaft hole 4 into which the first carrier pin 15 is rotatably inserted. The shaft hole 4 is a hollow cylindrical hole, and its center is coaxial with the shaft center D of the first carrier pin 15. Note that the contact ratio of the first planet gear 12 is set to be at least greater than one.

One end surface of the rim 1 in the axial direction is provided with a lightening portion 3 having a shape recessed toward the other end surface. The lightening portion 3 is a part that is formed in such a manner that a circular area of which a distance to the shaft center D is equal to or less than a predetermined value on the one end surface of the rim 1 in the axial direction is recessed toward the other end surface. The lightening portion 3 is provided to at least one of the two end surfaces of the rim 1. It is preferable that the lightening portion 3 be provided in each of the two end surfaces. The shape of the lightening portion 3 in the one end surface may be different from the shape of the lightening portion 3 in the other end surface, or more preferably, the lightening portion 3 in the one end surface and the lightening portion 3 in the other end surface have the same shape. Moreover, the circular areas where the lightening portions 3 are formed are larger areas than at least the shaft hole 4. If the radius of the areas where the lightening portions 3 are formed is a predetermined value, the radius of the shaft hole 4 is less than the predetermined value (the radial dimension of the lightening portions 3).

Figure 5:
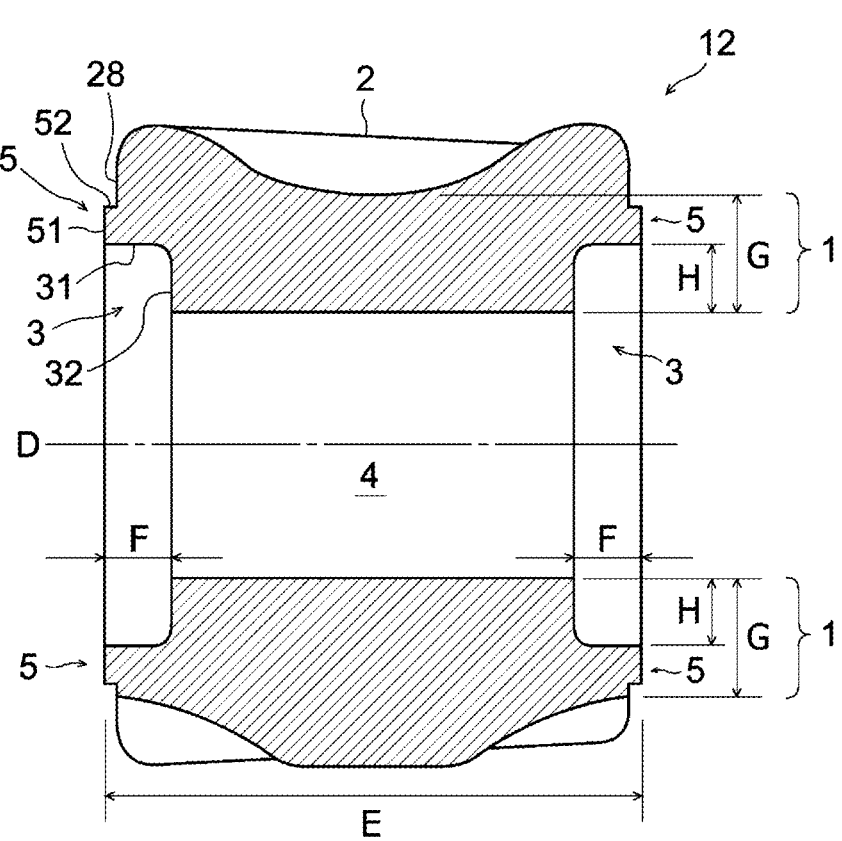
FIG. 5 is a cross-sectional view of the helical gear of FIG. 4.

FIG. 5 is a cross-sectional view of the first planet gear 12 (helical gear) in a section passing through the shaft center D. If a ratio of a value obtained by subtracting a lightening thickness H (counterbore diameter) of the lightening portion 3 from a rim thickness G to the tooth thickness J of the helical toothing portion 2 is defined as a ratio P, then "$P=(G-H)/J$." If the ratio P is 56.2 [%], a recess dimension F of the lightening portion 3 in the shaft center direction is set within a range from 4 to 22 [%] of a total length dimension E of the rim 1 in the axial direction. It is preferable that the recess dimension F be set within a range from 7 to 17 [%] of the total length dimension E. Moreover, the lightening portion 3 includes a side surface portion 31 formed by an inner peripheral surface of the cylindrical surface around the shaft center D, and a bottom surface portion 32 formed by a plane orthogonal to the shaft center D. The same applies to an end portion on the opening side of the side surface portion 31.

A dimension from a bottom land of the helical toothing portion 2 to a tubular surface of the shaft hole 4 is defined as the rim thickness G (the thickness of the rim). Moreover, a dimension obtained by subtracting the radius of the shaft hole 4 from a predetermined value of the lightening portion 3 is defined as the lightening thickness H. The rim thickness G and the lightening thickness H are exemplified in FIG. 5. If the ratio $P=56.2$ [%], the lightening thickness H is set at, preferably one-third or more of the rim thickness G, or more preferably more than half the rim thickness G. If the lightening thickness H increases, then the tooth root stress of the helical toothing portion 2 decreases.

Figure 6:
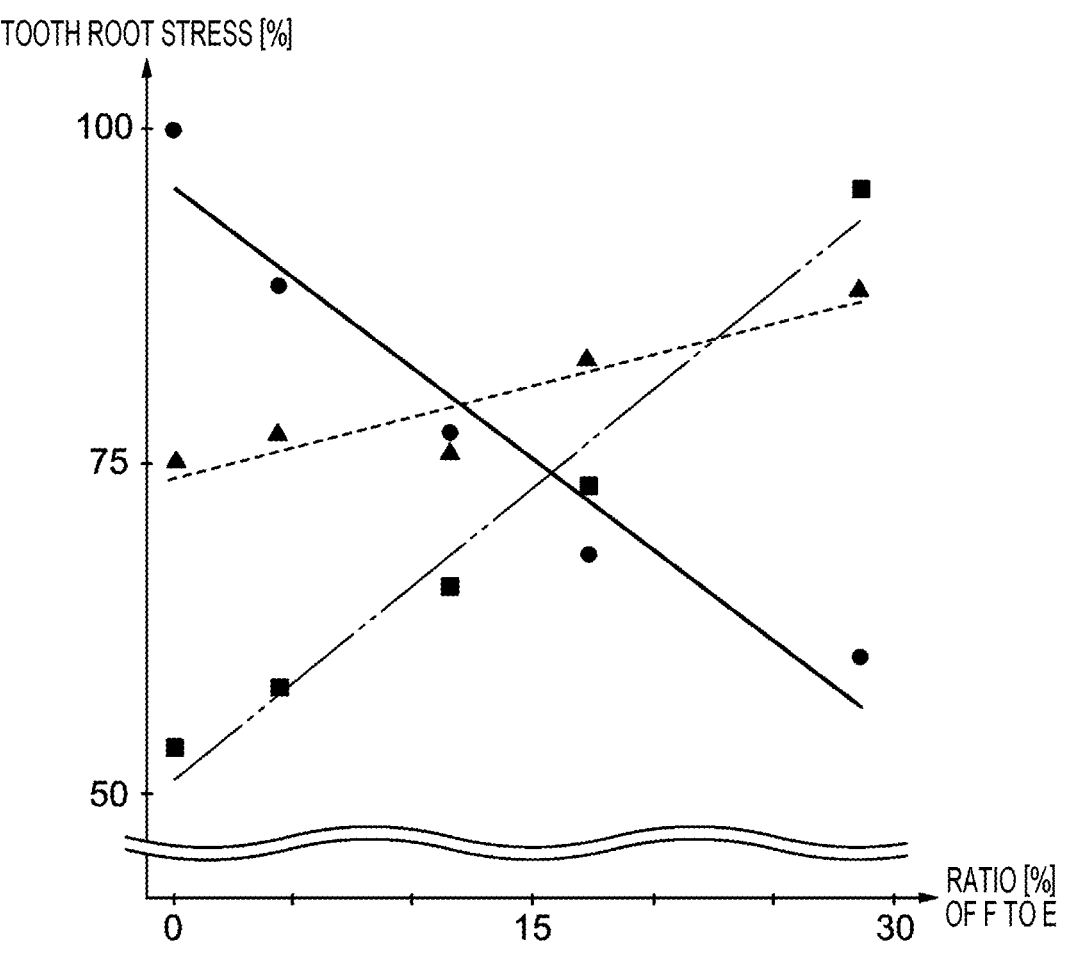
FIG. 6 is a graph illustrating relationships between the lightening rate and tooth root stress of the helical gear.
Figure 7:
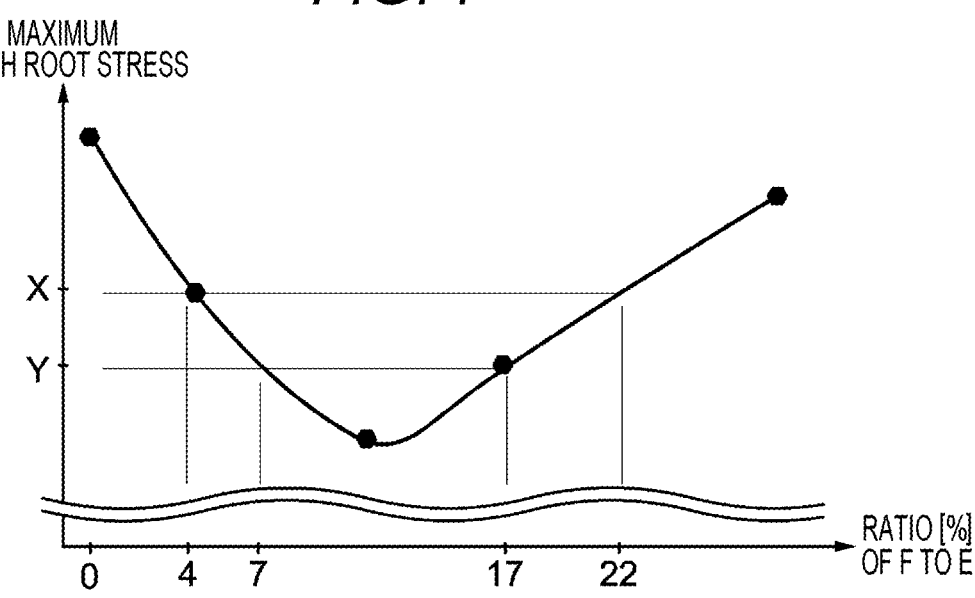
FIG. 7 is a graph illustrating relationships between the lightening rate and maximum tooth root stress of the helical gear.

FIGS. 6 and 7 are diagrams for explaining simulation results of Computer Aided Engineering (CAE) analysis at the ratio $P=56.2$ [%]. The inventor studied how various tooth root stresses changed when the shape of the first planet gear 12 (helical gear) was changed, by use of a computer and software for CAE analysis.

FIG. 6 is a graph illustrating relationships between the ratio (percentage) of the recess dimension F to the total length dimension E of the rim 1 in the axial direction and the tooth root stress of the helical toothing portion 2, in terms of the first planet gear 12. The vertical axis indicates a value of the tooth root stress expressed as a percentage, assuming that a maximum value of the tooth root stress at the time when the recess dimension F is zero (that is, the tooth root stress at the time when the ratio of the recess dimension F to the total length dimension E of the rim 1 in the axial direction is zero) is 100 [%]. Three kinds of tooth root stresses are considered. A first tooth root stress is tooth root stress produced on each of two axial end portions of the helical toothing portion 2 due to meshing with the first sun gear 11 and the first ring gear 13. A second tooth root stress is tooth root stress produced on an axial center portion of the helical toothing portion 2 due to the meshing with the first sun gear 11 and the first ring gear 13. A third tooth root stress is tooth root stress produced on the axial center portion of the helical toothing portion 2 due to support by the first carrier pin 15.

The magnitude of each of the tooth root stresses changes according to the recess dimension F of the lightening portion 3. Put another way, the magnitude of the each of the tooth root stresses changes according to the ratio of the recess dimension F to the total length dimension E.

The first tooth root stress reduces as the recess dimension F increases, as indicated by black circles and a thick solid line in FIG. 6. On the other hands, the second tooth root stress increases as the recess dimension F increases, as indicated by black triangles and a broken line in FIG. 6. The same applies to the third tooth root stress. The third tooth root stress increases as the recess dimension F increases, as indicated by black squares and a chain double-dashed line in FIG. 6. The value of the each of the tooth root stresses changes substantially linearly with respect to the ratio of the recess dimension F to the total length dimension E.

As illustrated in FIG. 6, if the ratio of the recess dimension F to the total length dimension E is too small, the first tooth root stress becomes excessive. On the other hand, if the ratio of the recess dimension F to the total length dimension E is too large, the third tooth root stress becomes excessive. Therefore, it is important to set the ratio of the recess dimension F to the total length dimension E within an appropriate range. Consequently, a situation in which any of the three kinds of tooth root stresses increases excessively is prevented, and the tooth root stresses are generally small. The tooth root stresses can be reduced by approximately 20% as compared to a case without the lightening portion 3.

FIG. 7 is an approximate curve exemplifying relationships between the ratio of the recess dimension F to the total length dimension E (the horizontal axis) and a maximum tooth root stress of the three kinds of tooth root stresses illustrated in FIG. 6 (the maximum tooth root stress, the vertical axis). According to trial calculations by the inventor, a range of the ratio of F within which the value of the maximum tooth root stress is equal to or less than a predetermined value X when the ratio P is 56.2 [%] is 4 to 22 [%]. X is a smaller value than in the case without the lightening portion 3 (that is, the case where the recess dimension F is zero). Therefore, the ratio of F is set within such a range, so that the maximum tooth root stress is reduced to the predetermined value X or less, and the strength of the gear increases. Moreover, a range of the ratio of F within which the value of the maximum tooth root stress is equal to or less than a second predetermined value Y less than the predetermined value X is 7 to 17 [%]. Therefore, the ratio of F is set within such a range, so that the maximum tooth root stress is reduced to the predetermined second value Y or less, and the strength of the gear increases further.

As illustrated in FIG. 5, the one end surface of the rim 1 in the axial direction is provided with a sliding contact portion 5 that protrudes outward of a helical toothing end surface 28 being an end surface of the helical toothing portion 2 in the axial direction. The sliding contact portion 5 is a part formed by causing an annular area of which a distance to the shaft center D on the one end surface of the rim 1 in the axial direction exceeds a predetermined value (the dimension of the radius of the lightening portion 3) to protrude toward an opposite side to the other end surface side (outward). The sliding contact portion 5 is provided to at least one of the two end surfaces of the rim 1. It is preferable that the sliding contact portion 5 be provided to each of the two end surfaces. The shape of the sliding contact portion 5 on the one end surface side may be different from the shape of the sliding contact portion 5 on the other end surface side, or more preferably, the sliding contact portion 5 on the one end surface side and the sliding contact portion 5 on the other end surface side have the same shape.

Each of the sliding contact portions 5 is provided with a first surface portion 51 and a second surface portion 52. Each of the first surface portions 51 is a part that is formed by a plane orthogonal to the shaft center D. The each of the first surface portions 51 is provided in such a manner as to be in surface contact with another member of which the position is fixed, such as the gear housing 8 or the cover 9. Moreover, each of the second surface portions 52 is a part that is formed by a cylindrical surface in such a manner as to connect between the first surface portion 51 and the helical toothing end surface 28. The each of the first surface portions 51 is movably supported by another member to prevent the displacement and movement of the first planet gear 12 in the axial direction.

As illustrated in FIG. 1, the member in surface contact with the first surface portion 51 is simply required to movably support at least a part of the first surface portion 51, and does not need to movably support the entire first surface portion 51 at a time. Moreover, the total length dimension E illustrated in FIG. 5 indicates a distance between the first surface portion 51 on the one end surface side and the first surface portion 51 on the other end surface side, however, may be a distance between the helical toothing end surface 28 on the one end surface side and the helical toothing end surface 28 on the other end surface side. If the sliding contact portion 5 is provided only on one side, the total length dimension E may be a distance between the first surface portion 51 on the one end surface side and the helical toothing end surface 28 on the other end surface side.

Figure 8:
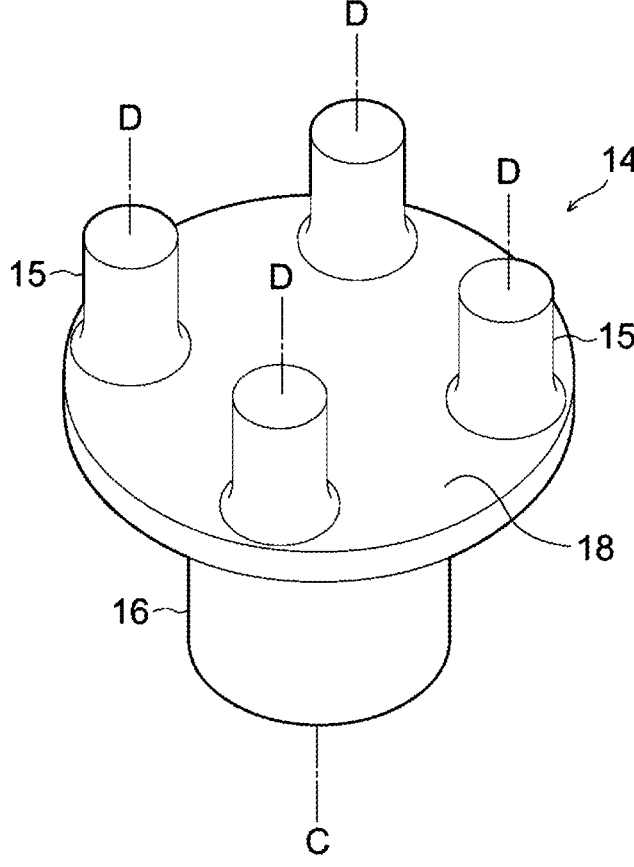
FIG. 8 is a perspective view of a first carrier of FIG. 1.

FIG. 8 is a perspective view of the first carrier 14 of the first planetary gear 10 illustrated in FIG. 3. The first carrier 14 is provided with a disk portion 18 formed into a disk shape perpendicular to the central axis C, the columnar first carrier pins 15 standing on one plate surface of the disk portion 18, and the columnar first carrier shaft 16 standing on the other plate surface of the disk portion 18. The number of the first carrier pins 15 is four, corresponding to the four first planet gears 12.

Each of FIGS. 9A and 9B are a cross-sectional views for explaining the shape of a proximal end portion of the first carrier pin 15 (an enlarged view of A of FIG. 1). Stress for receiving a force from the first planet gear 12 is produced on the first carrier pin 15. Especially the vicinity of the proximal end portion where stress tends to be concentrated is formed into an arc in a cross section passing through the shaft center D. It is desirable to increase a curvature radius r as much as possible to mitigate stress concentration. Hence, the shape of the proximal end portion of the first carrier pin 15 is formed in such a manner that its central angle θ is equal to or less than 90° in the cross section passing through the shaft center D. For example, the shape of the proximal end portion of the first carrier pin 15 is formed in such a manner as to have an arc of approximately 30°. As an example, it is assumed that the diameter of the first planet gears 12 is ϕ10, and the diameter of the four first carrier pins 15 is ϕ5. The central angle θ of the arc forming the cross section of the proximal end portion of the first carrier pin 15 is set within, for example, a range from 20 to 50°, or preferably, within a range from 25 to 35°, or more preferably, at 30°.

If the proximal end portion is designed in an arc having a central angle θ of 90°, the upper limit of the curvature radius r of the arc is approximately 2.5 to prevent interference between the first carrier pins 15. Moreover, if, for example, the curvature radius r of the arc is set to be greater than 2.5 (for example, approximately r 20.0), the necessity to separate the first carrier pins 15 arises, which results in an increase in the size of the first planetary gear 10. On the other hand, even if the central angle θ of the arc is set at approximately 30° to set the curvature radius r at a large value (for example, approximately r 20.0), the necessity to separate the first carrier pins 15 is avoided. Therefore, a reduction in the size of the first planetary gear 10 is facilitated.

Note that as illustrated in FIG. 9A, an upper end of the arc forming the proximal end portion of the first carrier pin 15 may be smoothly connected to a tubular surface of the first carrier pin 15, and a lower end of the arc may be connected to the disk portion 18 by a smooth curve (for example, an arc having a smaller curvature radius, or a spline curve). Moreover, as the curvature radius r increases, stress tends to be concentrated on the lower end of the arc. Therefore, as illustrated in FIG. 9B, the arc forming the proximal end portion of the first carrier pin 15 may be formed by shifting the phase (the position relative to the center) of the arc.

For example, in the example illustrated in FIG. 9A, the upper end of the arc is located in the direction of nine o'clock relative to the center of a broken line circle (the leftward horizontal direction from the center). In contrast, in the example illustrated in FIG. 9B, the upper end of the arc is located in the direction of eight o'clock relative to the center of a broken line circle (the left-down direction from the center). In this manner, in terms of the arc forming the proximal end portion of the first carrier pin 15, the direction of the normal to the upper end may be set in a direction parallel to the disk portion 18 (the horizontal direction in FIG. 9A), or set not in a parallel direction but in an oblique direction. However, it is preferable that the tubular surface of the first carrier pin 15 and the upper end of the arc be smoothly connected at a boundary portion therebetween by, for example, an arc having a smaller curvature radius, or a spline curve. The same applies to a boundary portion between the disk portion 18 and the lower end of the arc.

Moreover, stress is larger on the upper portion side of the arc forming the proximal end portion of the first carrier pin 15 than on the lower portion side of the arc. Therefore, it is preferable that an angle $\theta_A$ illustrated in FIG. 9B be set to be greater than an angle $\theta_B$ ($\theta_A > \theta_B$). In FIG. 9B, the angle $\theta_A$ is an angle which a line segment linking the upper end of the arc forming the proximal end portion of the first carrier pin 15 and the center of the arc forms with the tubular surface of the first carrier pin 15. Moreover, in FIG. 9B, the angle GB is an angle which a line segment linking the lower end of the arc forming the proximal end portion of the first carrier pin 15 and the center of the arc forms with the plate surface of the disk portion 18.

FIG. 10 is a cross-sectional view of the latch portion 40 of FIG. 1 (a cross-sectional view of B of FIG. 1). The latch portion 40 is provided in, for example, each of a plurality of places. The latch portions 40 are placed at predetermined intervals in circumferential directions of the gear housing 8 and the cover 9. Moreover, each of the latch portions 40 is provided with a pawl 41 protruding from the gear housing 8, and a pawl receiver 43 recessed in the cover 9. As illustrated in FIG. 1, the gear housing 8 is moved toward the cover 9 along the central axis C. The pawl 41 is fitted into the pawl receiver 43, so that the protruding and recessed shapes are engaged with each other. Consequently, the gear housing 8 and the cover 9 are locked together.

In a cross section of the latch portion 40 illustrated in FIG. 10, each of two end portions of the pawl 41 in the circumferential direction is provided with a pawl end surface 42. Each of two end portions of the pawl receiver 43 in the circumferential direction is provided with a pawl receiver end surface 44 in such a manner as to correspond to the pawl end surface 42. The pawl receiver end surfaces 44 are formed with a size that allows them to come into surface contact with the entire pawl end surfaces 42. Put another way, the shapes of the pawl 41 and the pawl receiver 43 are formed in such a manner that the radially outer surface of the pawl 41 is located inward of a radially outer surface of the pawl receiver 43. Such a structure allows the pawl end surfaces 42 to collide with the entire pawl receiver end surfaces 44, respectively (does not cause offset collisions between the pawl end surfaces 42 and the pawl receiver end surfaces 44), for example, when the gear housing 8 rotates about the central axis C. Therefore, the pawl 41 is prevented from opening and jutting out of the pawl receiver 43 (the engagement is released), and it is easy to maintain the state where the gear housing 8 and the cover 9 are engaged with each other.

When the pawl end surface 42 is protruding radially outward of the end surface of the pawl receiver 43, even if the protruding place is only a part of the pawl end surface 42, the pawl end surface 42 has an offset collision (partial collision). As a result, a radially outward force may act on the pawl 41 to cause the pawl 41 to open and burst out of the pawl receiver 43. In contrast, as illustrated in FIG. 10, the pawl end surfaces 42 are structured in such a manner as to fit in the pawl receiver 43, which makes the pawl 41 resistant to bursting out.

2. Analysis Results

FIGS. 11 to 20 are diagrams for explaining simulation results of CAE analysis according to the above example. The inventor studied how various tooth root stresses changed when the shape of the first planet gear 12 (helical gear) was changed, by use of the computer and software for CAE analysis. The ratio P of the value obtained by subtracting the lightening thickness H (counterbore diameter) of the lightening portion 3 from the rim thickness G to the tooth thickness J of the helical toothing portion 2 is defined as a first ratio P. Moreover, the ratio of the recess dimension F of the lightening portion 3 in the shaft center direction to the total length dimension E of the rim 1 in the axial direction is defined as a second ratio Q. In other words, "Q=F/E."

Note that analysis conditions (for example, the mesh size, the number of meshes, and the mesh shape of an analysis structure) related to the simulation results illustrated in FIGS. 11 to 20 are slightly different from analysis conditions related to the simulation results illustrated in FIGS. 6 and 7. Therefore, the point to note is that the simulation results illustrated in FIGS. 11 to 20 do not necessarily agree completely with the simulation results illustrated in FIGS. 6 and 7. Moreover, in terms of interpretations of the simulation results illustrated in FIGS. 6, 7, and 11 to 20, another point to add is that what is expected is the attitude to work toward grasping technical features and characteristics that are derived from the analysis results without being bound by differences and inconsistencies in trivial matters (such as specific numerical values and graph shapes).

FIG. 11 is a table illustrating simulation results of a case where the first ratio P was fixed at 19.0 [%], and the recess dimension F of the lightening portion 3 in the shaft center direction was changed within a range of the second ratio Q from 3.6 to 12.1 [%]. The analysis conditions were as follows: the rim thickness G was 1.69 [mm], the lightening thickness H (counterbore diameter) was 1.49 [mm], the tooth thickness J was 1.05 [mm], the facewidth of the helical toothing portion 2 was 7.0 [mm], and the input torque was 2.0 [Nm].

Figure 12:
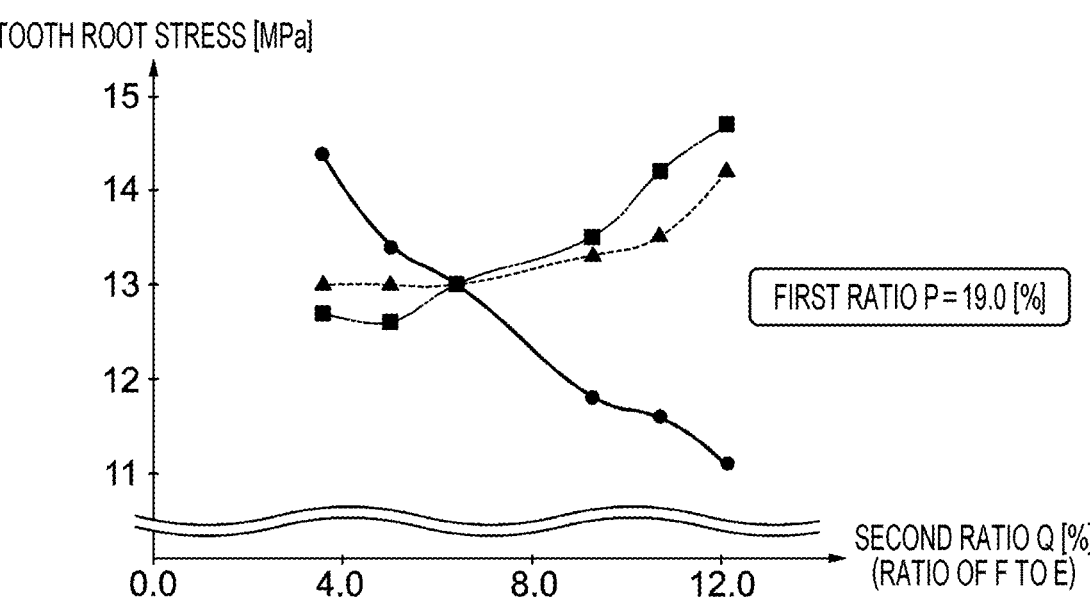
FIG. 12 is a graph illustrating the relationships between the second ratios and the tooth root stresses, which are illustrated in FIG. 11.

FIG. 12 illustrates, in graph form, the behavior of the three kinds of tooth root stresses [MPa] illustrated in FIG. 11 with respect to the second ratio Q [%]. Black circles and a thick solid line in FIG. 12 indicate the first tooth root stresses and an approximate curve. Similarly, black triangles and a broken line indicate the second tooth root stresses and an approximate curve, and black squares and a chain double-dashed line indicate the third tooth root stresses and an approximate curve. It can be seen from these graphs that the first tooth root stress is relatively large in a region where the second ratio Q is relatively small, whereas the second and third tooth root stresses are relatively large in a region where the second ratio Q is relatively large.

Figure 13:
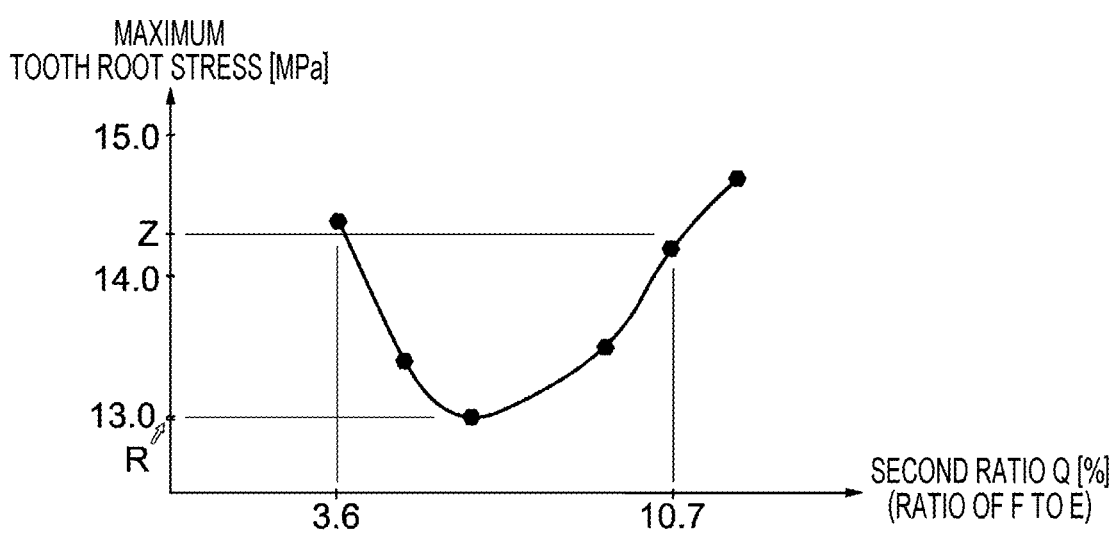
FIG. 13 is a graph illustrating relationships between the second ratios and maximum tooth root stresses, which are illustrated in FIG. 11.

FIG. 13 illustrates, in graph form, relationships between the second ratios Q [%] in FIG. 11 and maximum values [MPa] of the first, second, and third tooth root stresses with respect to the second ratios Q. Black circles and a thick solid line in FIG. 13 indicate the maximum tooth root stresses and an approximate curve. Let a minimum value (bottom value) of the maximum tooth root stress in the graph be R. It can be said that a range of the second ratio Q where the maximum tooth root stress is smaller than a value Z obtained by multiplying the minimum value R by a predetermined coefficient K is a range where the first, second, and third tooth root stresses are not excessively large and are generally small. The minimum value R in FIG. 13 is 13.0 [MPa]. Moreover, from the result of the diligent study of the inventor, it has been understood that if the increase of the maximum tooth root stress with respect to the minimum value R is within 10 [%](K 1.1), an excellent effect can be obtained. If the predetermined coefficient K is 1.1, then the value Z is 14.3 [MPa]. If a range of the second ratio Q where the maximum tooth root stress is equal to or less than the value Z is extracted, the range is from approximately 3.6 to 10.7 [%]. Note that a specific value of the predetermined coefficient K can be freely set, however, is set within, for example, a range of 1.0<K≤1.5.

FIG. 14 is a table illustrating simulation results of a case where the first ratio P was fixed at 56.2 [%], and the recess dimension F of the lightening portion 3 in the shaft center direction was changed within a range of the second ratio Q from 5.0 to 15.0 [%]. The analysis conditions were as follows: the rim thickness G was 1.69 [mm], the lightening thickness H (counterbore diameter) was 1.1 [mm], the tooth thickness J was 1.05 [mm], the facewidth of the helical toothing portion 2 was 7.0 [mm], and the input torque was 2.0 [Nm].

FIG. 15 illustrates, in graph form, the behavior of the three kinds of tooth root stresses [MPa] illustrated in FIG. 14 with respect to the second ratio Q [%]. Black circles and a thick solid line in FIG. 15 indicate the first tooth root stresses and an approximate curve. Similarly, black triangles and a broken line indicate the second tooth root stresses and an approximate curve, and black squares and a chain double-dashed line indicate the third tooth root stresses and an approximate curve. It can be seen from these graphs that the first tooth root stress is relatively large in a region where the second ratio Q is relatively small, whereas the third tooth root stress is relatively large in a region where the second ratio Q is relatively large. Moreover, it can also be seen that it is not necessary to consider much about the second tooth root stress to study the maximum tooth root stress if the first ratio P is 56.2 [%].

FIG. 16 illustrates, in graph form, relationships between the second ratios Q [%] in FIG. 14 and maximum values [MPa] of the first, second, and third tooth root stresses with respect to the second ratios Q. Black circles and a thick solid line in FIG. 16 indicate the maximum tooth root stress and an approximate curve. The minimum value R in FIG. 16 is 15.2 [MPa]. Moreover, when the predetermined coefficient K is 1.1, the value Z is 16.72 [MPa]. If a range of the second ratio Q where the maximum tooth root stress is equal to or less than the value Z is extracted, the range is from approximately 6.4 to 15.0 [%].

FIG. 17 is a table illustrating simulation results of a case where the first ratio P was fixed at 103.8 [%], and the recess dimension F of the lightening portion 3 in the shaft center direction was changed within a range of the second ratio Q from 6.4 to 23.6 [%]. The analysis conditions were as follows: the rim thickness G was 1.69 [mm], the lightening thickness H (counterbore diameter) was 1.49 [mm], the tooth thickness J was 1.05 [mm], the facewidth of the helical toothing portion 2 was 7.0 [mm], and the input torque was 2.0 [Nm].

FIG. 18 illustrates, in graph form, the behavior of the three kinds of tooth root stresses [MPa] illustrated in FIG. 17 with respect to the second ratio Q [%]. Black circles and a thick solid line in FIG. 18 indicate the first tooth root stresses and an approximate curve. Similarly, black triangles and a broken line indicate the second tooth root stresses and an approximate curve, and black squares and a chain double-dashed line indicates the third tooth root stresses and an approximate curve. It can be seen from these graphs that the first tooth root stress is relatively large in a region where the second ratio Q is relatively small, whereas the third tooth root stresses is relatively large in a region where the second ratio Q is relatively large. Moreover, it can also be seen that it is not necessary to consider much about the second tooth root stress to study the maximum tooth root stress if the first ratio P is 103.8 [%].

FIG. 19 illustrates, in graph form, relationships between the second ratios Q [%] in FIG. 17 and maximum values [MPa] of the first, second, and third tooth root stresses with respect to the second ratios Q. Black circles and a thick solid line in FIG. 19 indicate the maximum tooth root stresses and an approximate curve. The minimum value R in FIG. 19 is 14.6 [MPa]. Moreover, when the predetermined coefficient K is 1.1, the value Z is 16.06 [MPa]. If a range of the second ratio Q where the maximum tooth root stress is equal to or less than the value Z is extracted, the range is from approximately 10.7 to 19.3 [%].

Figure 20:
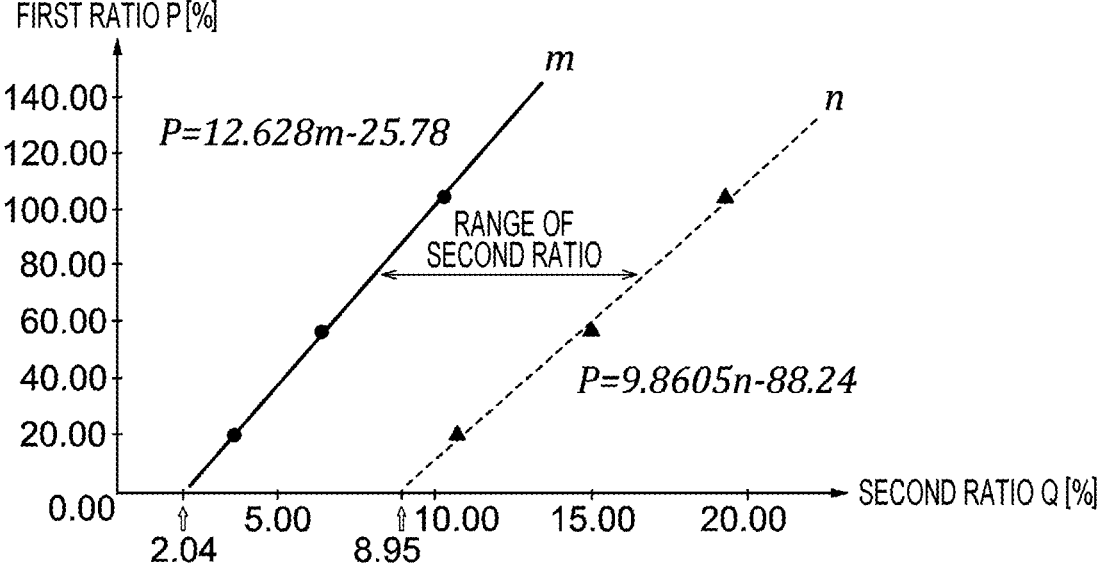
FIG. 20 is a graph illustrating relationships between the first ratio and the second ratio.

FIG. 20 illustrates, in graph form, relationships between the range of the second ratio Q [%] extracted from each of FIGS. 13, 16, and 19 and the first ratio P. Black circles and black triangles in FIG. 20 indicate two ends of the range of the second ratio Q. Let a smaller one of the two ends be m, and the other be n (m<n). In terms of the range of the second ratio Q, as the first ratio P increases, both of the two ends m and n determining the range of the second ratio Q move in an increasing direction. In other words, it has been understood that a preferable range of the second ratio Q changes according to the first ratio P.

When the coordinates of each of the ends m and n are linearly approximated, the following approximate formulae representing relationships between the first ratio P and the two ends m and n of the range of the second ratio Q is obtained:

$$P = 12.628m - 25.78$$

$$P = 9.8605n - 88.24$$

where P: the first ratio [%], m: one end [%], and n: the other end [%].

From the above approximation formulae, it has been understood that as the first ratio P increases, the range of the second ratio Q increases. The graph of the end m is indicated by a thick solid line in FIG. 20, and the graph of the end n is indicated by a broken line. A range between the thick solid lien and the broken line in FIG. 20 is a preferable range of the first ratio P and the second ratio Q. A range where the black circles and the black triangles are present in FIG. 20 is a range from 19.0 to 103.8 [%] for the first ratio P, and a range from 2 to 22 [%] for the second ratio Q.

Note that in a coordinate system representing the relationships between the first ratio P and the second ratio Q such as illustrated in FIG. 20, a region providing a preferable combination of the first ratio P and the second ratio Q can be defined as a rectangular region that satisfies the following four inequalities (expressions A to D).

$$P \le aQ - b \qquad \text{[Equation A]}$$

$$P \ge cQ - d \qquad \text{[Equation B]}$$

$$P \ge e \qquad \text{[Equation C]}$$

$$P \le f \qquad \text{[Equation D]}$$

where P: the first ratio [%], Q: the second ratio [%], a>c>0, and f>e≥0.

The example illustrated in FIG. 20 corresponds to a case where a=12.628, b=25.78, c=9.8605, and d=88.24. Moreover, if the upper and lower limits of the first ratio P are set within the range where the black circles and the black triangles are present, e=19.0 and f=103.8. However, the upper and lower limit values of the first ratio P are not limited to the above, and the values of e and f can be freely set as long as at least f>e≥0 holds.

3. Operations and Effects (1) The helical gear (the first planet gear 12) as the example is provided with the helical toothing portion 2 of which helical tooth traces are formed on the outer tubular surface of the cylindrical rim 1, and the lightening portion 3 that is formed in such a manner that the area of which a distance to the shaft center D is equal to or less than the predetermined value on the one end surface of the rim 1 in the axial direction is recessed toward the other end surface. In the above helical gear, the ratio of the value obtained by subtracting the lightening thickness H of the lightening portion 3 from the thickness G of the rim 1 to the tooth thickness J of the helical toothing portion 2 is defined as the first ratio P, and the ratio of the recess dimension F to the total length dimension E of the rim 1 in the axial direction is defined as the second ratio Q. Moreover, as illustrated in FIG. 20, the relationship between the first ratio P and the end m of the range of the second ratio Q is given by the mathematical formula "P=12.628m−25.78." The relationship between the first ratio P and the end n of the range of the second ratio Q is given by the mathematical formula "P=9.8605n−88.24."

Such a configuration allows the range of the second ratio Q where the first to third tooth root stresses are generally suppressed to be easily determined, and the tooth root stress produced on the helical toothing portion 2 can be reduced. Moreover, it is possible for the above mathematical formulae to clearly define the relationships between the first ratio P and the second ratio Q, and it is possible to further ensure that the tooth root stress produced on the helical toothing portion 2 is reduced.

(2) As illustrated in FIGS. 11 to 20, it has been confirmed that the tooth root stress produced on the helical toothing portion 2 can be reduced in the range of the first ratio P from 19.0 to 103.8 [%]. Therefore, it is preferable that the first ratio P be within the range from 19.0 to 103.8 [%].

Note that the first ratio P may be set within the range from 19.0 to 103.8 [%] and the second ratio Q may be set within a range from 3.6 to 19.3 [%]. Such a configuration can more reliably achieve a preferable combination of the first ratio P and the second ratio Q, as illustrated in FIG. 20.

(3) As illustrated in FIGS. 11 to 20, it has been confirmed that the tooth root stress produced on the helical toothing portion 2 can be reduced in the range of the second ratio Q from 6.4 to 15.0 [%]. Therefore, it is preferable that the second ratio Q be within the range from 6.4 to 15.0 [%].

In the coordinate system representing the relationships between the first ratio P and the second ratio Q, the region providing a combination of the first ratio P and the second ratio Q can be defined as the rectangular region that satisfies the following four inequalities (expressions A to D).

$$P \le aQ - b \qquad \text{[Equation A]}$$

$$P \ge cQ - d \qquad \text{[Equation B]}$$

$$P \ge e \qquad \text{[Equation C]}$$

$$P \le f \qquad \text{[Equation D]}$$

where P: the first ratio [%], Q: the second ratio [%], a>c>0, and f>e≥0.

Such a configuration also allows the relationships between the first ratio P and the second ratio Q to be clearly defined and allows further ensuring that the tooth root stress produced on the helical toothing portion 2 is reduced.

Note that if the first ratio P is 19.0 [%], it is preferable that the second ratio Q be within the range from 3.6 to 10.7 [%]. Consequently, as illustrated in FIG. 13, it is possible to ensure that the maximum tooth root stress is reduced to the value Z or less (for example, 14.3 [MPa] or less).

Moreover, if the first ratio P is 56.2 [%], it is preferable that the second ratio Q be within the range from 6.4 to 15.0 [%]. Consequently, as illustrated in FIG. 16, it is possible to ensure that the maximum tooth root stress is reduced to the value Z or less (for example, 16.72 [MPa] or less).

Moreover, if the first ratio P is 103.8 [%], it is preferable that the second ratio Q be within the range from 10.7 to 19.3 [%]. Consequently, as illustrated in FIG. 19, it is possible to ensure that the maximum tooth root stress is reduced to the value Z or less (for example, 16.06 [MPa] or less).

(4) In the helical gear (the first planet gear 12) as the example, the lightening portion 3 is provided in each of the two end surfaces of the rim 1. It is preferable that the two lightening portions 3 have the same shape, and the recess dimension F of the one end surface is equal to the recess dimension F of the other end surface. Such a configuration allows the tooth root stress to be reduced equally on the two end surfaces of the gear, and allows the anti-breakage performance to improve further.

(5) The helical gear as the example is the first planet gear 12 of the first planetary gear 10 and includes the shaft hole 4 into which the first carrier pin 15 is rotatably inserted. The shaft hole 4 is bored in a hollow cylindrical shape that is coaxial with the shaft center D and has the smaller radius than the predetermined value (the dimension of the radius of the lightening portion 3). Such a configuration allows the tooth root stress at the two axial end portions of the first planet gear 12 to be reduced and allows the anti-breakage performance to improve further, as indicated by the thick solid line in FIG. 6.

(6) The helical gear (the first planet gear 12) as the example is provided with the sliding contact portion 5 formed by causing the annular area of which a distance to the shaft center D on the one end surface of the rim 1 in the axial direction exceeds the predetermined value (the dimension of the radius of the lightening portion 3) to protrude toward the opposite side to the other end surface side. The sliding contact portion 5 functions as a receiving surface for preventing the surface on a thrust direction side from rubbing directly against the toothing end surface when the helical gear moves in a thrust direction. Therefore, it is possible to maintain the performance of the first planet gear 12 for a long period of time and encourage an improvement in product quality.

(7) The reducer 7 as the example includes the above helical gear (the first planet gear 12), the input shaft 17, and the output shaft (the first carrier shaft 16). The input shaft 17 is connected to the first sun gear 11 in the first planetary gear 10. Moreover, the first carrier shaft 16 that is the output shaft is connected to the first carrier 14 on which the first carrier pins 15 that support the first planet gears 12 are mounted. Such a configuration allows the anti-breakage performance of the first planet gear 12 built in the reducer 7 to improve and allows the quality of the reducer 7 to improve.

4. Others

The above example is a mere exemplification, and is not intended to preclude various modifications and application of a technology, which are not explicitly stated in the example. The configurations of the example can be modified carried out in various manners within the scope that does not depart from the purport of the configurations. Moreover, a selection can be made from the configurations of the example as needed, or the configurations of the example can be combined with various configurations included in the known technology as appropriate.

In the above example, the first planet gear 12 is taken up as an example of a helical gear, and described in detail. However, the structure of the helical gear of the present invention can also be applied to other gears. For example, the structure of a helical gear such as illustrated in FIGS. 4 and 5 may be applied to the second planet gear 22 of the second planetary gear 20. Alternatively, a similar structure may be applied to the first sun gear 11 and the second sun gear 21. Moreover, the reducer 7 to which the helical gear of the present invention is applied is exemplified in the above example. However, a device to which the helical gear of the present invention is applied is not limited to a reducer, and can be applied to various power transmission devices such as a gear motor, a cycloid reducer, and a transmission (gearbox).

The invention claimed is:

1. A helical gear comprising:

a helical toothing portion comprising helical tooth traces formed on an outer tubular surface of a cylindrical rim; and a lightening portion comprising a recess on a first end surface of the cylindrical rim, wherein a distance from an outer surface of the lightening portion to a shaft center is equal to or less than a predetermined value, wherein a ratio obtained by subtracting a lightening thickness of the lightening portion from a thickness of the rim to obtain a difference and the difference is divided by a tooth thickness of the helical toothing portion defines a first ratio, and a ratio of a dimension of the recess of the lightening portion in an axial direction to a total length dimension of the rim in the axial direction is defined as a second ratio, relationships between the first ratio and two ends of a range of the second ratio are given by the following mathematical formulae:

$$P = 12.628m - 25.78$$

$$P = 9.8605n - 88.24$$

where P: the first ratio [%], m: the first one end [%], and n: a second end [%].

2. The helical gear according to claim 1, wherein the first ratio is within a range from 19.0 to 103.8 [%].

3. The helical gear according to claim 1, wherein the second ratio is within a range from 6.4 to 15.0 [%].

4. The helical gear according to any of claim 1, further comprising:

a second lightening portion in the second end of the rim in the axial direction, and the recess dimension of the lightening portion is equal to a recess dimension of the second lightening portion.

5. The helical gear according to claim 1, wherein the helical gear is a planet gear of a planetary gear, and includes a shaft hole that is bored in a hollow cylindrical shape that is coaxial with the shaft center and has a smaller radius than the predetermined value and into which a carrier pin of the planetary gear is rotatably inserted.

6. The helical gear according to claim 5, further comprising a sliding contact portion formed by causing an annular area of which a distance to the shaft center on the one end surface of the rim in the axial direction exceeds the predetermined value to protrude toward an opposite side to the other end surface side.

7. A reducer comprising:

the helical gear according to claim 5;

an input shaft connected to a sun gear of the planetary gear; and an output shaft connected to a carrier including the carrier pin.

* * * * *